2,780,651

PROCESS FOR THE MANUFACTURE OF A POLYENE ALDEHYDE

Otto Isler, Marc Montavon, and Rudolf Rüegg, Basel, and Paul Zeller, Neuallschwil, Switzerland, assignors to Hoffmann-La Roche Inc., Nutley, N. J., a corporation of New Jersey No Drawing. Application June 28, 1954,
Serial No. 439,861

Claims priority, application Switzerland July 2, 1953

8 Claims. (Cl. 260—598)

This invention relates to an improvement in the synthesis of the compound, 2,6-dimethyl-8-(2,6,6-trimethyl-1-cyclohexenyl)-2,4,6-octatrien-1-al and to novel intermediates and processes useful in practicing this improved synthesis. The above identified compound, often referred to by the abbreviated designation "$\beta$-$C_{19}$-aldehyde," is useful in the synthesis of $\beta$-carotene as described in the prior publications of Inhoffen and collaborators, see for instance "Annalen der Chemie" 570, 54 (1950) and 571, 75 (1951).

The process provided by the present invention comprises reacting 2-methyl-4-(2,6,6-trimethyl-1-cyclohexenyl)-2-buten-1-al ($\beta$-$C_{14}$-aldehyde) with a tri(lower alkyl)ester of a lower orthoalkanoic acid in the presence of an acidic condensation agent to produce 1,1-di(lower alkoxy)-2-methyl-4-(2,6,6-trimethyl-1-cyclohexenyl)-2-butene ($\beta$-$C_{14}$-acetal), reacting the latter in the presence of an acidic condensation agent first with a vinyl lower alkyl ether and then with a propenyl lower alkyl ether to produce 1,1,3,5-tetra(lower alkoxy)-2,6-dimethyl-8-(2,6,6-trimethyl-1-cyclohexenyl)-6-octene ($\beta$-$C_{19}$-diether-acetal), and hydrolysing the latter in aqueous acid medium to produce 2,6-dimethyl-8-(2,6,6-trimethyl-1-cyclohexenyl)-2,4,6-octatrien-1-al ($\beta$-$C_{19}$-aldehyde).

Additional aspects of the invention are exemplified by the novel intermediates referred to above as $\beta$-$C_{19}$-diether-acetal and the novel process herein disclosed of making this intermediate; as well as the novel step herein disclosed of converting the $\beta$-$C_{19}$-diether-acetal to $\beta$-$C_{19}$-aldehyde.

The first step in the procedure described in detail below comprises the acetalization of $\beta$-$C_{14}$-aldehyde. This can be accomplished according to acetalization procedures known per se. For example, the acetalization can be effected by reaction of the aldehyde with an ester of an ortho carboxylic acid in the presence of an acidic condensation agent such as boron trifluoride etherate, zinc chloride, ammonium chloride, ammonium nitrate, p-toluenesulfonic acid, phosphoric acid, etc. Especially suitable for this purpose are the ortho esters of lower aliphatic acids with lower aliphatic alcohols, preferably the trimethyl, triethyl, or tri-n-butyl ester of orthoformic acid. The acetals of $\beta$-$C_{14}$-aldehyde thus obtained are colourless oils, which show no maximal absorption in the ultraviolet spectrum above 225 m$\mu$. Special purification thereof, e. g. by distillation, is not necessary for further processing according to the invention.

In the second step of the procedure, $\beta$-$C_{14}$-acetal is condensed with a vinyl lower alkyl ether in the presence of an acidic condensation agent to produce 1,1,3-tri(lower alkoxy)-4-methyl-6-(2,6,6-trimethyl-1-cyclohexenyl)-4-hexene ($\beta$-$C_{16}$-ether-acetal). Suitable condensation agents are boron trifluoride etherate, zinc chloride, titanium tetrachloride, aluminum chloride, ferric chloride, stannic chloride, etc. It is advantageous to employ the vinyl ether of the same alcohol with which the $\beta$-$C_{14}$-aldehyde has been acetalized, e. g. by reacting $\beta$-$C_{14}$-aldehydedimethyl acetal with methyl vinyl ether, the corresponding diethyl acetal with ethyl vinyl ether, the corresponding di-n-butyl acetal with n-butyl vinyl ether, etc. The condensation should be effected at the lowest temperature possible; thereby undesired side reactions can be avoided, such as polymerization or condensation with the vinyl ether of the $\beta$-$C_{16}$-ether-acetal produced. The optimal reaction temperature lies between 25 and 60° C., depending upon the condensation agent chosen and the $\beta$-$C_{14}$-acetal and the vinyl lower alkyl ether chosen for the reaction. In a preferred exemplification of the process, approximately equimolar quantities of $\beta$-$C_{14}$-acetal and of vinyl ether are reacted with each other in the presence of zinc chloride at about 25 to 50° C. There are thus obtained $\beta$-$C_{16}$-ether-acetals of high purity in almost quantitative yields. These products are colourless oils, which show no maximal absorption in the ultraviolet spectrum above 225 m$\mu$. The further processing of the $\beta$-$C_{16}$-ether-acetal preferably takes place in the same reaction vessel, without intermediate purification.

The third step of the herein described procedure is the condensation of the $\beta$-$C_{16}$-ether-acetal with a propenyl lower alkyl ether in the presence of an acidic condensation agent to produce $\beta$-$C_{19}$-diether-acetal. As in the second step of the process, suitable condensation agents are borontrifluoride etherate, zinc chloride, titanium tetrachloride, aluminum chloride, ferric chloride, stannic chloride, etc. It is advantageous to use the propenyl ether of the same alcohol with which the $\beta$-$C_{14}$-aldehyde has been acetalized, e. g. by reacting 1,1,3-trimethoxy-4-methyl-6-(2,6,6-trimethyl-1-cyclohexenyl)-4-hexene with methyl propenyl ether, or by reacting 1,1,3-triethoxy-4-methyl-6-(2,6,6-trimethyl-1-cyclohexenyl)-4-hexene with ethyl propenyl ether, or by reacting 1,1,3-tri(n-butoxy)-4-methyl-6-(2,6,6-trimethyl-1-cyclohexenyl)-4-hexene with n-butyl propenyl ether. In a preferred exemplification of this step, a large excess of the $\beta$-$C_{16}$-ether-acetal, for example three times the molar amount, is reacted with the propenyl ether in the presence of boron trifluoride etherate at about 40 to 60° C. As soon as the reaction is completed, the $\beta$-$C_{16}$-ether-acetal in excess may be recovered, for example by neutralising the condensation agent and distilling off the $\beta$-$C_{16}$-ether-acetal. The latter may then be reacted with propenyl ether again.

The $\beta$-$C_{19}$-diether-acetals which are formed during the condensation step described above are colourless oils, which show no absorption maximum above 225 m$\mu$. For purposes of further processing in the improved synthesis of the invention, it is unnecessary to subject the $\beta$-$C_{19}$-diether-acetals to special purification procedures, such as distillation.

The final step in the process of the invention comprises hydrolysing $\beta$-$C_{19}$-diether-acetal in aqueous acid medium according to hydrolysis procedures known per se; this reaction is advantageously so carried out, e. g. by heating to about 100° C., that $\beta$-$C_{19}$-aldehyde is simultaneously produced by splitting out alcohol between the 2,3- and 4,5-positions. It is suitable to carry out this step of the reaction in the presence of water soluble organic or inorganic acids, e. g. p-toluene sulfonic acid, sulfuric acid, phosphoric acid, or of water-soluble salts of acidic reaction, such as zinc chloride. It is desirable to exclude oxygen during the reaction and to add an antioxidant to the reaction mixture, for example hydroquinone. It is further recommended to work under conditions such that the alcohol produced can be continuously distilled from the reaction mixture. A water-miscible solvent, such as dioxan, can be added to the reaction mixture in order to obtain a homogeneous reaction phase. The $\beta$-$C_{19}$-aldehyde thus formed may be isolated and purified by distillation, by dispersing the same between solvents or by crystallisation.

The β-C$_{19}$-aldehyde obtained according to the present process melts at 62–63° C. Boiling point 130–132° C./0.03 mm. It has in petroleum ether a strong tendency to crystallise.

EXAMPLE 1

From β-C$_{14}$-aldehyde to β-C$_{14}$-acetal

A mixture of 206 g. of 2-methyl-4-(2,6,6-trimethyl-1-cyclohexenyl)-2-buten-1-al and 193 g. of orthoformic acid triethyl ester was mixed with a warm solution of 3.6 g. of ammonium nitrate in 70 cc. of absolute ethanol and allowed to stand at room temperature for at least 24 hours. Then the reaction mixture was taken up in ether, shaken with sodium bicarbonate solution and dried over potassium carbonate. The ether solution was concentrated and the residue was distilled under high vacuum. There was thus obtained 257 g. of 1,1-diethoxy-2-methyl-4-(2,6,6-trimethyl-1-cyclohexenyl)-2-butene, B. P. 100° C./0.4 mm., $n_D^{21}$=1.4773.

In analogous manner, but substituting orthoformic acid trimethyl ester in lieu of orthoformic acid triethyl ester, there was obtained 1,1-dimethoxy-2-methyl-4-(2,6,6-trimethyl-1-cyclohexenyl)-2-butene, B. P. 157° C./14 mm., $n_D^{27}$=1.4800. Similarly, by substituting orthoformic acid tri-n-butyl ester, the product obtained was 1,1-di-n-butoxy-2-methyl-4-(2,6,6-trimethyl-1-cyclohexenyl) - 2 - butene, B. P. 133° C./0.3 mm., $n_D^{25}$=1.4739. By substituting orthoformic acid tri-isobutyl ester, the product obtained was 1,1-tri-isobutoxy-2-methyl-4-(2,6,6-trimethyl-1-cyclohexenyl)-2-butene, B. P. 124° C./0.01 mm., $n_D^{22}$=1.4700.

EXAMPLE 2

From β-C$_{14}$-acetal to β-C$_{16}$-ether-acetal 280 g. of 1,1-diethoxy-2-methyl - 4 - (2,6,6-trimethyl-1-cyclohexenyl)-2-butene and 1 g. of anhydrous zinc chloride were heated to 40° C. while stirring. 76 g. of ethyl vinyl ether were gradually added to the reaction mixture, the rate of addition being regulated so that the reaction temperature remained between 40° and 45° C. After completion of the addition, stirring was continued for an additional hour at 45° C., then the reaction mixture was taken up in ether, washed with dilute sodium hydroxide solution and dried over potassium carbonate. The ether solution was concentrated and the residue was distilled in high vacuum. There was thus obtained 320 g. of 1,1,3-triethoxy-4-methyl-6-(2,6,6 - trimethyl-1-cyclohexenyl)-4-hexene, B. P. 127–129° C./0.01 mm., $n_D^{24}$=1.4705.

In the same manner, by reacting 1,1-diethoxy-2-methyl-4-(2,6,6-trimethyl-1-cyclohexenyl)-2-butene with methyl vinyl ether there was obtained 1,3-diethoxy-1-methoxy-4-methyl - 6 - (2,6,6 - trimethyl-1-cyclohexenyl)-4-hexene, B. P. 125° C./0.2 mm., $n_D^{25}$=1.4720.

By similarly reacting 1,1-dimethoxy-2-methyl-4-(2,6,6-trimethyl-1-cyclohexenyl)-2-butene with ethyl vinyl ether there was obtained 1-ethoxy-1,3-dimethoxy-4-methyl-6-(2,6,6-trimethyl-1-cyclohexenyl)-4-hexene, B. P. 127° C./0.03 mm., $n_D^{25}$=1.4760. Similarly, by reacting 1,1-di-n-butoxy-2-methyl-4-(2,6,6-trimethyl - 1 - cyclohexenyl)-2-butene with n-butyl vinyl ether, there was obtained 1,1,3-tri-n-butoxy - 4 - methyl-6-(2,6,6-trimethyl - 1 - cyclohexenyl)-4-hexene, B. P. 155–160° C./0.01 mm., $n_D^{27}$=1.4692.

EXAMPLE 3

From β-C$_{16}$-ether-acetal to β-C$_{19}$-diether-acetal 123 g. of 1,1,3-triethoxy-4-methyl-6-(2,6,6-trimethyl-1-cyclohexenyl)-4-hexene were heated, while stirring, with 0.2 cc. of borontrifluoride etherate to 45° C., whereupon 8.7 g. of ethyl propenyl ether were slowly added. The rate of addition was regulated so that the reaction temperature remained at 45° C. Stirring was continued for an additional 4 hours at 45° C., then the reaction mixture was taken up in ether, washed with dilute sodium hydroxide solution and dried over potassium carbonate. After concentration of the ether solution, the residue was distilled in high vacuo. There was obtained a first fraction of about 100 g. of 1,1,3-triethoxy-4-methyl-6-(2,6,6-trimethyl-1-cyclohexenyl)-4-hexene, which had been added in excess. The second fraction of about 20 g. consisted of 1,1,3,5 - tetraethoxy-2,6-dimethyl-8-(2,6,6-trimethyl-1-cyclohexenyl)-6-octene of boiling point 133–140° C./0.01 mm., $n_D^{20}$=1.4720.

EXAMPLE 4

From β-C$_{19}$-diether-acetal to β-C$_{19}$-aldehyde

A mixture of 9.5 g. of 1,1,3,5-tetraethoxy-2,6-dimethyl-8-(2,6,6-trimethyl - 1 - cyclohexenyl)-6-octene, 5 cc. of water, 75 cc. of dioxane and 0.75 g. of p-toluene sulfonic acid was heated in a nitrogen atmosphere to about 100° C. for 7 hours in the presence of traces of hydroquinone as antioxidant. During the heating, a mixture of dioxane, alcohol and water distilled off. In order to keep the volume of the reaction mixture constant, a mixture of dioxane and water in the proportion of 10:1 was slowly added. Thereupon, the reaction mixture was poured on ice-water and the reaction product was taken up in ether. The ethereal solution was washed first with sodium bicarbonate solution and then with water, and it was dried over sodium sulfate. The ether was evaporated, whereupon the residue was distilled in high vacuo. The fraction boiling at 120–130° C. under a pressure of 0.01 mm. consisted of 2,6-dimethyl-8-(2,6,6-trimethyl - 1 - cyclohexenyl)-2,4,6-octatriene-1-al and could be purified by recrystallisation in petroleum ether. Melting Point 62–63° C.

EXAMPLE 5

From β-C$_{14}$-aldehyde to β-C$_{19}$-aldehyde

A mixture of 104 g. of 2-methyl-4-(2,6,6-trimethyl-1-cyclohexenyl)-2-buten-1-al, 77 g. of orthoformic acid triethylester and 32 cc. of absolute ethanol was mixed with 0.6 cc. of a 1 percent alcoholic p-toluene sulfonic acid solution, and the mixture was stirred for 15 hours at 20–30° C. Then 6 cc. of pyridine was added and the whole mixture was poured on a mixture of 70 g. of a 5 percent sodium bicarbonate solution and 70 g. of ice. The mixture was stirred for 20 minutes, whereupon the lower aqueous layer was separated off. The upper layer was dried and concentrated in vacuo in order to eliminate the volatile byproducts. There was obtained a residue of about 130 g. of 1,1-diethoxy-2-methyl-4-(2,6,6-trimethyl-1-cyclohexenyl)-2-butene of $n_D^{20}$=1.478. This product was condensed with vinyl ethyl ether without further purification. To this end, it was heated while stirring to 30° C., 0.6 cc. of a 10 percent solution of zinc chloride in ethyl acetate was added, and, in the course of about 4 hours, 50 cc. of vinyl ethyl ether and 10 cc. of a 10 percent solution of zinc chloride in ethyl acetate were simultaneously introduced into the mixture, the temperature being maintained at 30–35° C. Stirring was then continued for 15 hours at room temperature. The 1,1,3 - triethoxy-4-methyl-6-(2,6,6-trimethyl-1-cyclohexenyl)-4-hexene thus formed of $n_D^{20}$=1.473 was further processed according to Examples 3 and 4.

We claim:

1. A process which comprises reacting 2-methyl-4-(2,6,6 - trimethyl - 1 - cyclohexenyl)-2-buten-1-al with a tri(lower alkyl)ester of a lower orthoalkanoic acid in the presence of an acidic condensation agent to produce 1,1-di(lower alkoxy)-2-methyl-4-(2,6,6-trimethyl-1-cyclohexenyl)-2-butene, reacting the latter in the presence of an acidic condensation agent first with a vinyl lower alkyl ether and then with a propenyl lower alkyl ether to produce 1,1,3,5-tetra(lower alkoxy)-2,6-dimethyl-8-(2,6,6-trimethyl-1-cyclohexenyl)-6-octene, and hydrolysing the latter in aqueous acid medium to produce 2,6-dimethyl-8-(2,6,6-trimethyl-1-cyclohexenyl)-2,4,6-octatrien-1-al.

2. The process of claim 1, wherein the 1,1-di(lower alkoxy) - 2 - methyl-4-(2,6,6-trimethyl-1-cyclohexenyl)-2-butene is condensed with the vinyl ether and with the propenyl ether of the same alcohol with which the 2-methyl - 4 - (2,6,6-trimethyl-1-cyclohexenyl)-2-buten-1-al has been acetalised.

3. The process of claim 1, wherein equimolecular amouts of 1,1 - di(lower alkoxy)-2-methyl-4-(2,6,6-trimethyl-1-cyclohexenyl)-2-butene and vinyl lower alkyl ether are reacted at 25–50° C. in the presence of zinc chloride and the 1,1,3-tri(lower alkoxy)-4-methyl-6-(2,6,6 - trimethyl-1-cyclohexenyl)-4-hexene is processed further without previous purification.

4. The process of claim 1, wherein the 1,1,3-tri(lower alkoxy) - 4 - methyl-6-(2,6,6-trimethyl-1-cyclohexenyl)-4-hexene is reacted in large excess with a propenyl-lower alkyl ether at 40–60° C. in the presence of boron tri-fluoride etherate.

5. The process of claim 1, wherein the 1,1,3,5-tetra(lower alkoxy - 2,6 - dimethyl-8-(2,6,6-trimethyl-1-cyclohexenyl)-6-octene is heated with aqueous p-toluene sulfonic acid in the presence of a water-miscible solvent, and the alcohol produced is continuously distilled off.

6. The process of claim 1, wherein the 2,6-dimethyl-8-(2,6,6 - trimethyl - 1 - cyclohexenyl)-2,4,6-octatriene-1-al formed is isolated in crystallised form.

7. 1,1,3,5 - tetra(lower alkoxy)-2,6-dimethyl-8-(2,6,6-trimethyl-1-cyclohexenyl)-6-octene.

8. A process of making 2,6-dimethyl-8-(2,6,6-trimethyl-1 - cyclohexenyl)-2,4,6-octatrien-1-al which comprises heating 1,1,3,5-tetra(lower alkoxy)-2,6-dimethyl-8-(2,6,6-trimethyl-1-cyclohexenyl)-6-octene in aqueous acidic medium.

References Cited in the file of this patent
UNITED STATES PATENTS 2,586,305    Copenhaver _____ Feb. 19, 1952